(12) United States Patent
Van Hooren et al.

(10) Patent No.: US 9,506,584 B2
(45) Date of Patent: Nov. 29, 2016

(54) HOSE LINE FOR A FLUID

(71) Applicant: VERITAS AG, Gelnhausen (DE)

(72) Inventors: Marc Van Hooren, Freigericht (DE); Bernd Stoschek, Kefenrod (DE); Wilfried Zuelch, Gelnhausen (DE)

(73) Assignee: VERITAS AG, Gelnhausen (DE)

( * ) Notice: Subject to any disclaimer, the term of this patent is extended or adjusted under 35 U.S.C. 154(b) by 0 days.

(21) Appl. No.: 14/657,979

(22) Filed: Mar. 13, 2015

(65) Prior Publication Data

US 2015/0260315 A1    Sep. 17, 2015

(30) Foreign Application Priority Data

Mar. 14, 2014  (DE) .................. 10 2014 103 479

(51) Int. Cl.
| | | |
|---|---|---|
| *F16L 11/00* | (2006.01) | |
| *F16L 11/127* | (2006.01) | |
| *F16L 11/04* | (2006.01) | |
| *F16L 11/20* | (2006.01) | |

(52) U.S. Cl.
CPC .............. *F16L 11/127* (2013.01); *F16L 11/04* (2013.01); *F16L 11/20* (2013.01); *F16L 2011/047* (2013.01)

(58) Field of Classification Search
CPC ....... F16L 11/127; F16L 11/04; F16L 11/085; B29C 47/0004

USPC .............. 138/125, 103, 140, 137; 428/36.91, 428/36.1, 36.2

See application file for complete search history.

(56) References Cited

U.S. PATENT DOCUMENTS

| | | | | |
|---|---|---|---|---|
| 2,320,367 A | * | 6/1943 | Leathers | ............... F16L 11/127 15/314 |
| 3,070,132 A | * | 12/1962 | Sheridan | ............. A61B 5/0424 128/202.24 |

(Continued)

FOREIGN PATENT DOCUMENTS

| | | |
|---|---|---|
| DE | 1251600 B | 10/1967 |
| DE | 10312942 A1 | 10/2004 |

(Continued)

OTHER PUBLICATIONS

European Patent Office, "European Search Report", issued in connection with European application No. EP 15 15 7702, on Apr. 15, 2015 (6 pages).

*Primary Examiner* — Patrick F Brinson
(74) *Attorney, Agent, or Firm* — Loeb & Loeb LLP

(57) ABSTRACT

A hose line for a fluid, with an exterior support layer; a homogeneous barrier layer arranged within the support layer to prevent diffusion of the fluid; and an electrically conductive strip arranged on the internal side of the barrier layer to discharge electrical charges.

13 Claims, 2 Drawing Sheets

(56) References Cited

U.S. PATENT DOCUMENTS

| | | | |
|---|---|---|---|
| 3,555,170 A * | 1/1971 | Petzetakis | B29C 70/22 138/103 |
| 3,828,112 A | 8/1974 | Johansen et al. | |
| 3,907,955 A * | 9/1975 | Viennot | B29C 47/0004 174/47 |
| 5,124,878 A * | 6/1992 | Martucci | B29C 63/24 138/125 |
| 5,142,782 A | 9/1992 | Martucci | |
| 5,192,476 A | 3/1993 | Green | |
| 5,381,834 A * | 1/1995 | King | F16L 11/085 138/103 |
| 5,974,649 A * | 11/1999 | Marena | B29C 47/0004 204/249 |
| 6,257,280 B1 * | 7/2001 | Marena | B29C 47/0004 138/125 |
| 6,302,150 B1 * | 10/2001 | Martucci | B29D 23/001 138/125 |
| 7,040,351 B2 * | 5/2006 | Buck | F16L 11/127 138/123 |
| 7,861,746 B2 * | 1/2011 | Zimmer | F16L 9/125 138/125 |
| 2010/0282355 A1 * | 11/2010 | Seyler | F16L 11/04 138/140 |

FOREIGN PATENT DOCUMENTS

| | | |
|---|---|---|
| EP | 1249337 A2 | 10/2002 |
| EP | 1260747 A1 | 11/2002 |

* cited by examiner

HOSE LINE FOR A FLUID

FIELD OF THE INVENTION

The present invention relates to a hose line for a fluid and to a method for the production of a hose line for a fluid.

RELATED TECHNOLOGY

The document DE 103 12 942 B4 describes a multilayer, electrically conductive line with a support layer and a barrier layer arranged within the support layer, with an electrically conductive section extending in the longitudinal direction of the line. The radial extent of the electrically conductive sections here is precisely the same as the radial extent of the barrier sections. The electrically conductive sections are present as segments at the internal surface of the barrier layer. The barrier layer is therefore inhomogeneous, since it is composed of alternating conductive and non-conductive sections.

The electrically conductive sections of the barrier layer are composed of compositions based on fluoropolymers. These have poorer mechanical properties, for example hardness, brittleness or low-temperature impact resistance, than the corresponding underlying materials in the non-conductive sections.

SUMMARY

The object on which the invention is based is to provide a hose line which is suitable for discharging electrical charges, without impairing the mechanical or dynamic properties of the hose line.

This object is achieved by subject matter with the features according to the independent claims. Advantageous embodiments of the invention are provided by the figures, the description, and the dependent claims.

According to a first aspect of the invention, the object is achieved via a hose line for a fluid, with an exterior support layer; a homogeneous barrier layer arranged within the support layer to prevent diffusion of the fluid; and an electrically conductive strip arranged on the internal side of the barrier layer to discharge electrical charges. The hose line can be a fuel hose for fuel in a motor vehicle. The fluid can comprise hydrocarbons. This approach achieves by way of example the technical advantage that the electrically conductive strips do not adversely affect the mechanical properties of the barrier layer. The dynamic properties of the hose line are likewise retained, and are not adversely affected by the additional conductive strips.

In an advantageous embodiment of the hose line, the barrier layer comprises a thermoplastic fluoroelastomer vulcanizate F-TPE-V or a thermoplastic fluoroelastomer F-TPE. This approach achieves by way of example the technical advantage that particularly suitable materials are used for the barrier layer, for example those that prevent diffusion of liquid hydrocarbons.

In another advantageous embodiment of the hose line, the conductive strip comprises a thermoplastic fluoroelastomer vulcanizate F-TPE-V, a thermoplastic fluoroelastomer F-TPE or a fluorothermoplastic, for example terpolymer of tetrafluoroethylene, hexafluoropropylene and vinylidene fluoride THV, terpolymer of ethylene, tetrafluoroethylene and hexafluoropropylene EFEP, copolymer of ethylene and tetrafluoroethylene ETFE, or vinylidene fluoride VDF, to which conductive fillers, for example carbon black, carbon nanotubes CNT, carbon fiber CF or graphite, have been admixed. This approach achieves by way of example the technical advantage that particularly suitable materials which can efficiently discharge a charge are used for the electrically conductive strip.

In another advantageous embodiment of the hose line, the hose line comprises a plurality of electrically conductive strips which run on the internal side of the barrier layer. This approach achieves by way of example the technical advantage that charges can be particularly efficiently discharged at a plurality of locations of the internal side.

In another advantageous embodiment of the hose line, the electrically conductive strips intersect with one another on the internal side of the barrier layer. This approach achieves by way of example the technical advantage that the charges can be transferred from one electrically conductive strip to another. Interruption of an electrically conductive strip thus does not lead to interruption of discharge of charges.

In another advantageous embodiment of the hose line, the electrically conductive strip protrudes from the barrier layer into the interior of the hose line. This approach achieves by way of example the technical advantage that the electrical strip additionally guides the fluid and turbulence of the fluid is prevented.

In another advantageous embodiment of the hose line, the homogeneous barrier layer comprises a recess to receive the electrically conductive strip. This approach achieves by way of example the technical advantage of firm attachment of the electrically conductive strip at the internal side of the barrier layer.

In another advantageous embodiment of the hose line, a thickness of the electrically conductive strip in radial direction is between 30 µm and 60 µm. This approach achieves by way of example the technical advantage that the electrically conductive strip has only little effect on the barrier layer.

In another advantageous embodiment of the hose line, the hose line comprises another electrically conductive strip arranged on the external side of the barrier layer. This approach achieves by way of example the technical advantage that discharge of charges is further improved.

In another advantageous embodiment of the hose line, the electrical strip takes the form of an arc of a circle in covering the barrier layer. This approach achieves by way of example the technical advantage that the electrically conductive strip has a large area of contact with the fluid.

In another advantageous embodiment of the hose line, the hose line comprises four electrical strips arranged at a distance of 90° to one another. This approach achieves by way of example the technical advantage that efficient discharge of charges is rendered possible in each quadrant of the hose line.

In another advantageous embodiment of the hose line, the hose line comprises an internal layer to cover the electrical strip on the internal side of the barrier layer. This approach achieves by way of example the technical advantage that the electrically conductive strip does not come directly into contact with the fluid.

According to a second aspect of the invention, the object is achieved via a method for the production of a hose line for a fluid, with the steps of extrusion of an electrically conductive strip to discharge electrical charges; on-extrusion of a homogeneous barrier layer onto the electrically conductive strip to prevent diffusion of the fluid; and on-extrusion of an exterior support layer onto the barrier layer. This approach achieves by way of example the technical advantage of producing a hose line in which the mechanical properties of the barrier layer are not adversely affected by the electrically conductive strips.

In an advantageous embodiment of the method, the electrically conductive strip is produced with a thickness between 20 µm and 60 µm. This approach achieves by way of example the above-mentioned technical advantage that the electrically conductive strips do not adversely affect the mechanical properties of the barrier layer.

In another advantageous embodiment of the method, the electrically conductive strip is extruded in the interior of the surrounding barrier layer. This approach achieves by way of example the technical advantage that the hose line is amenable to easy production.

BRIEF DESCRIPTION OF THE DRAWINGS

Embodiments are depicted in the drawings and are described in more detail in the following.

DETAILED DESCRIPTION

Figure 1:
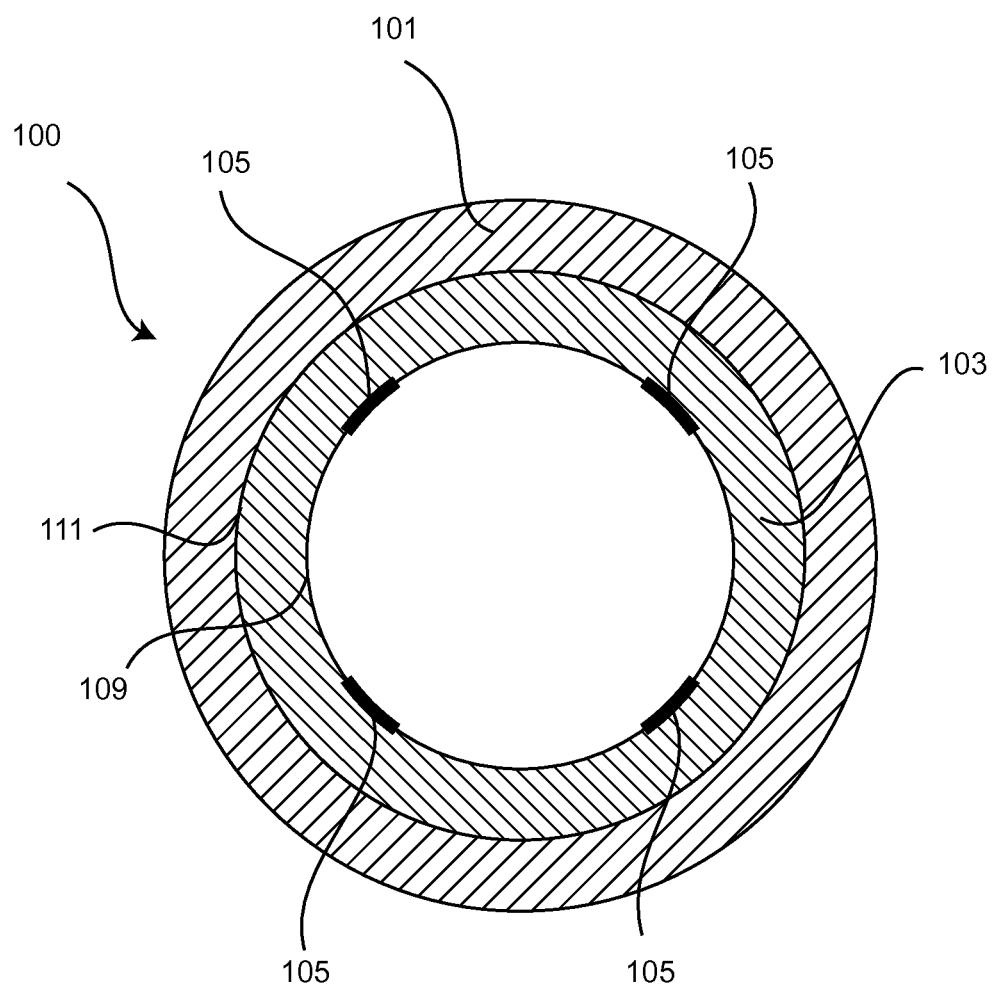
FIG. 1 shows a cross-sectional view of the hose line.

FIG. 1 shows a cross-sectional view of the hose line 100 for the conduct of a fluid, for example a fuel hose for fuels in a motor vehicle. The hose line 100 comprises an exterior support layer 101 which provides strength to the hose line 100 and serves as support for other layers of the hose line 100. There can be a textile incorporated into the support layer 101 in order to increase strength. There can be other layers arranged around the support layer 101. The support layer 101 is by way of example composed of an ozone-resistant material which comprises chlorinated polyethylene CPE, chlorosulphonated polyethylene CSM, acrylonitrile-butadiene elastomer NBR, chloroprene elastomer CR, epichlorohydrin elastomer ECO, ethylene-acrylate elastomer AEM, acrylate elastomer ACM, ethylene-vinyl acetate elastomer EVM or thermoplastic elastomers TPE (polyolefins). The thickness of the support layer 101 in hoses is typically from 0.8 mm to 1.5 mm, with diameter from 7 mm to 50 mm.

In the interior of the support layer 101, which takes the form of a hose, the arrangement has a fully enclosing, homogeneous and non-conductive barrier layer 103 which prevents outward diffusion of constituents of the fluid through the hose line 100. The radial thickness of the barrier layer 103 is in essence identical at every location. There is no interruption of the homogeneous barrier layer 103 by electrically conductive strips. The barrier layer 103 is by way of example composed of thermoplastic fluoroelastomer vulcanizate F-TPE-V or of thermoplastic fluoroelastomer F-TPE. The thickness of the barrier layer 103 is typically from 0.1 mm to 0.25 mm.

In order to discharge electrostatic charges, the arrangement has, on the internal side 109 of the continuous barrier layer 103, four electrically conductive strips 105, running in the longitudinal direction of the hose line 100 and configured as additions to the barrier layer 103. The electrically conductive strips 105 are by way of example configured as thin strips of thickness from 30 µm to 60 µm in contact with the internal side 109 of the coherent barrier layer 103. The electrically conductive strips 105 are in contact with the fluid.

In contrast to this, the electrically conductive strips 105 are not in contact with the support layer 101. The electrically conductive strips are by way of example made of a thermoplastic fluoroelastomer vulcanizate F-TPE-V, a thermoplastic fluoroelastomer F-TPE or a fluoro-thermoplastic, for example a terpolymer of tetra-fluoro-ethylene, hexafluoropropylene and vinylidene fluoride THV, a terpolymer of ethylene, tetrafluoroethylene and hexafluoropropylene EFEP, a copolymer of ethylene and tetrafluoroethylene ETFE, or a vinylidene fluoride VDF, to which the appropriate conductive fillers in each case, for example carbon black, carbon nanotubes CNT, carbon fiber CF and/or graphite, have been admixed.

This approach gives the advantage that the conductive strips 105 have not been integrated into the barrier layer 103 and the conductive strips 105 do not interrupt the barrier layer 103. The mechanical properties of the barrier layer 103 are not adversely affected by the electrically conductive strips 105, since these are in contact with the internal side 109 of the coherent, non-conductive barrier layer 103. The arrangement of the electrically conductive strips 105 further in the interior of the hose line 100 moreover permits saving of material for the production of the electrically conductive strips 105.

The dynamic properties of the barrier layer 103 are retained, and are not adversely affected by the additional conductive strips 105. The electrical strips 105 do not therefore alter the pressure resistance, the damping performance or the mechanical displacement values of the hose line 100. The conductive strips 105 moreover do not affect the permeation properties of the barrier layer 103. The homogeneous barrier layer 103 has no points of weakness, and there is therefore no fracture or damage along seams.

By virtue of this particular design of the hose line it is possible to use conductive thermoplastic materials, for example thermoplastic elastomers TPE or cross linked thermoplastic elastomers TPV for the conductive strips 105. The thermoplastic materials can comprise polyamides, tetra-fluoro-ethylene-hexafluoropropylene-vinylidene fluoride copolymer THV, ethylene-tetra-fluoroethylene ETFE, or ethylene-tetrafluoroethylene-hexafluoro-propene EFEP. The fluoro materials reliably prevent diffusion of hydrocarbons. Because the layer thickness of these materials is small, the characteristics of the hose are not affected.

Figure 2:
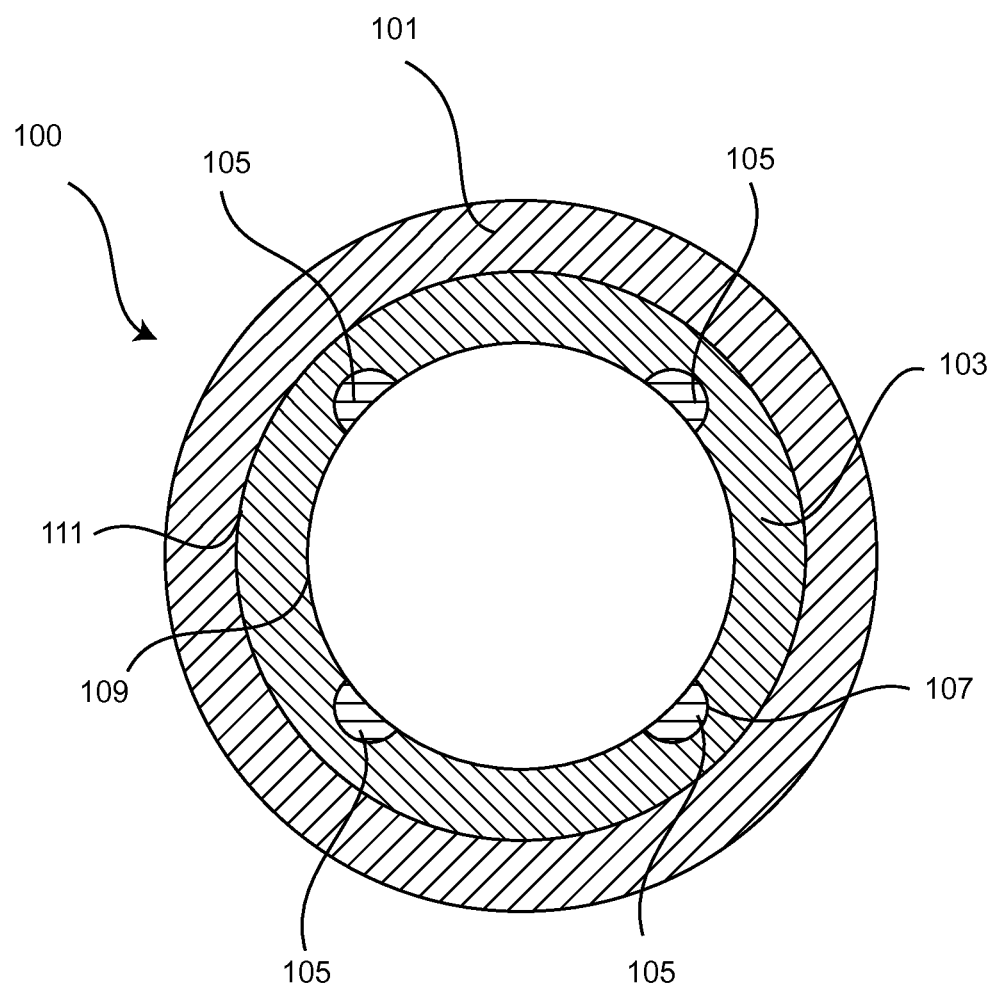
FIG. 2 shows another cross-sectional view of the hose line.

FIG. 2 shows a cross-sectional view of the hose line 100 for the conduct of a fluid, for example a fuel hose for fuels in a motor vehicle. The hose line 100 comprises a barrier layer 103 with recesses 107 into which the electrically conductive strips 105 have been inserted. The shapes of the electrically conductive strips 105 correspond to those of the recesses 107, and the surfaces of the said strips are flush with the internal side 109 of the barrier layer 103. In other respects, the design of the hose line corresponds to the design explained in connection with FIG. 1.

However, the electrically conductive strips 105 can generally also protrude to some extent into the interior of the hose line 100, so that these promote the flow of the fluid in the hose line 100 and prevent turbulence. The arrangement can have the electrical strips 105 in straight lines parallel to one another, or the electrical strips 105 can form spirals at the internal side 109 of the barrier layer 103. However, the arrangement can also have the electrically conductive strips 105 alternating in a right-handed and a left-handed spiral shape so as to give a plurality of intersection points between the respective electrically conductive strips 105. At the said intersection points it is possible that an electrical charge passes from one of the electrically conductive strips 105 to another electrically conductive strip 105. This approach can compensate for any point-interruption of electrically conductive strips 105. The arrangement can moreover also have other electrically conductive strips 105 at an external side 111 of the barrier layer 103.

The hose line 100 is by way of example produced via a method which first extrudes, from an extrusion mandrel, the internally located electrically conductive strips 105 to discharge electrical charges, for example with thickness between 30 μm and 60 μm. The homogeneous barrier layer 103 is then on-extruded externally with uniform layer thickness onto the electrically conductive strip, in order to prevent diffusion of the fluid. The exterior support layer 101 is then on-extruded with uniform thickness onto the barrier layer 103.

The invention can provide various combinations of all of the features revealed and explained in conjunction with individual embodiments of the invention, and advantageous effects of these can therefore be realized simultaneously.

The scope of protection of the present invention is defined via the claims, and is not restricted by the features explained in the description or revealed in the figures.

LIST OF REFERENCE SYMBOLS

100 Hose line
101 Support layer
103 Barrier layer
105 Conductive strip
107 Recess
109 Internal side
111 External side

The invention claimed is:

1. A hose line for a fluid, with:
an exterior support layer;
a homogeneous barrier layer arranged within the support layer to prevent diffusion of the fluid; and
an electrically conductive strip arranged on the internal side of the barrier layer to discharge electrical charges, wherein the electrically conductive strip protrudes from the barrier layer into the interior of the hose line.

2. The hose line according to claim 1, wherein the barrier layer comprises a thermoplastic fluoroelastomer vulcanizate or thermoplastic fluoroelastomer.

3. The hose line according to claim 1, wherein the conductive strip comprises a thermoplastic fluoroelastomer vulcanizate, a thermoplastic fluoroelastomer vulcanizate, a thermoplastic fluoroelastomer or a fluorothermoplastic, to which conductive fillers have been admixed.

4. The hose line according to claim 1, wherein the hose line comprises a plurality of electrically conductive strips which run on the internal side of the barrier layer.

5. The hose line according to claim 4, wherein the electrically conductive strips intersect with one another on the internal side of the barrier layer.

6. The hose line according to claim 1, wherein a thickness of the electrically conductive strip in radial direction is between 30 μm and 60 μm.

7. The hose line according to claim 1, wherein the hose line comprises an electrically conductive strip arranged on the external side of the barrier layer.

8. The hose line according to claim 1, wherein the electrical strip takes the form of an arc of a circle in covering the barrier layer.

9. The hose line according to claim 1, wherein the hose line comprises four electrical strips arranged at a distance of 90° to one another.

10. The hose line according to claim 1, wherein the hose line comprises an internal layer to cover the electrical strip on the internal side of the barrier layer.

11. A method for the production of a hose line for a fluid with the steps:
extruding an electrically conductive strip to discharge electrical charges;
on-extruding a homogeneous barrier layer onto the electrically conductive strip to prevent diffusion of the fluid; and
on-extruding an exterior support layer onto the barrier layer;
wherein the electrically conductive strip protrudes from the barrier layer into the interior of the hose line.

12. The method according to claim 11, wherein the electrically conductive strip is produced with a thickness between 20 μm and 60 μm.

13. The method according to claim 11, wherein the electrically conductive strip is extruded in the interior of the surrounding barrier layer.

* * * * *